(No Model.)
C. W. HUNT.
CONVEYER.
No. 468,109. Patented Feb. 2, 1892.
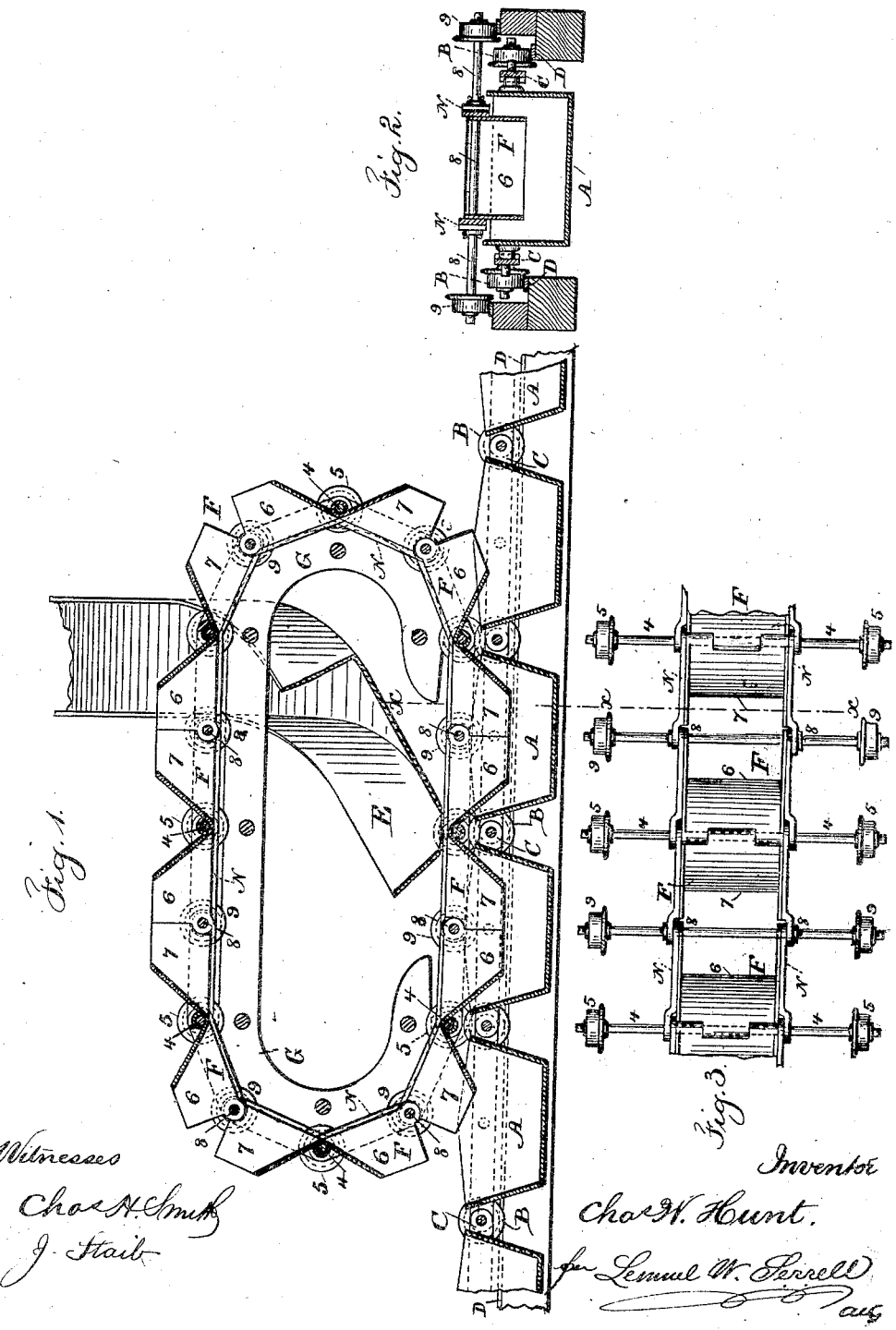

UNITED STATES PATENT OFFICE.

CHARLES W. HUNT, OF WEST NEW BRIGHTON, NEW YORK.

CONVEYER.

SPECIFICATION forming part of Letters Patent No. 468,109, dated February 2, 1892.

Application filed June 29, 1891. Serial No. 397,807. (No model.)

*To all whom it may concern:*

Be it known that I, CHARLES W. HUNT, a citizen of the United States, residing at West New Brighton, in the county of Richmond and State of New York, have invented an Improvement in Conveyers for Coal and other Materials, of which the following is a specification.

Buckets for the reception of coal and other substances have been connected together by chains and supported by wheels upon tracks, and the buckets have been filled with the coal or other material and drawn to the distant place for dumping or discharge. In an application heretofore made by me, Serial No. 395,198, I have represented a range of buckets with a series of hopper-shaped deflectors for directing the coal or other material into the buckets as the latter pass beneath a supply chute or spout. In my present improvements the deflectors are made in two parts hinged together in such a manner that they can be passed around a curved track or wheels of comparatively small diameter, so as to occupy but little space around the lower end of the supply chute or spout.

In the drawings, Figure 1 is a vertical longitudinal section representing the conveyer-buckets and my improved deflectors, and Fig. 2 is a detached section at the line $x\,x$ of Figs. 1 and 3. Fig. 3 is a detached plan view representing such improved deflectors.

The buckets A are of any suitable size and shape, and they are connected by chains C, having supporting-wheels B upon the tracks D, and at E is represented a portion of the lower end of the spout or chute for supplying the coal or other material. The deflectors F are of a suitable shape to pass into the upper portions of the buckets, and such deflectors are preferably hopper-shaped, so as to direct the coal or other material into the buckets as they pass successively beneath the chute or spout, and these deflectors travel along with the buckets of the conveyer, there being projections on the deflectors, against which the conveyer acts to move such deflectors in harmony with the buckets of the conveyer.

The buckets usually employed in conveying apparatus are of such a size that in cases where the deflectors are made rigid the distances between the cross-shafts or hinges 4, that connect the deflectors together, is so great that wheels or tracks of large diameter are necessary for the wheels 5 upon the shafts 4 of the deflectors to travel upon, and considerable space and weight of machinery are necessary for supporting the deflectors and the endless chains or connections for the same. To obviate these difficulties I make use of divided deflectors. The parts 6 and 7 of each deflector F are hinged together at 8, and the hinge-pins preferably form the axles for the wheels 9, and it is advantageous to provide chain-links N, that connect the shafts or axles 4 to the axles 8, so that two complete endless chains are provided for the deflectors, and the deflectors are hinged together in their middle portion at 8, and the outer ends of the deflectors are hinged together by the axles 4. It will be apparent by this construction that when the wheels 5 and 9 are upon a straight track the edges of the parts 6 and 7 of the deflectors are contiguous or abut one against the other, so as to form a complete deflector to intervene between the lower end of the spout or chute E and the top of the bucket A and direct the material running from such spout into the bucket, and the shape of each deflector as a whole is to be such that it will not contain more than the bucket will hold, so that as the deflector is raised and the contents thereof run into the bucket such bucket will not overflow; but as the chain of deflectors travels around the curved track G the links of the chain assume angular positions to each other and the adjacent edges of the deflectors separate or diverge, so that the endless chain of deflectors can pass around a comparatively small track or around two chain or sprocket wheels, which are the equivalents of a curved track, and the parts will occupy but a small space and are comparatively light.

I do not limit myself to any particular shape of the deflectors F, as the same may vary according to the size or shape of the bucket and the material operated upon.

I claim as my invention—

1. The combination, with a conveying apparatus and a supply chute or spout, of a range of deflectors hinged together and each deflector made of two parts hinged together at or near the middle, substantially as set forth.

2. The combination, with the conveyer and its supporting-tracks and the supply-chute, of two-part deflectors, the axles 4 for uniting the deflectors together at their ends, the hinges for uniting the two parts of the deflector together, and the supporting-wheels applied to the respective axles or pins, substantially as set forth.

3. The combination, with the conveyer-buckets, their connecting-chains, wheels, and track, of a supply spout or chute, a series of two-part deflectors, chain-links, and pins or axles for connecting the links, each deflector being separated at or near the center joints of the chains, and wheels and tracks for supporting the deflectors as they are moved around with the conveyers, substantially as set forth.

Signed by me this 24th day of June, 1891.

CHAS. W. HUNT.

Witnesses:
 GEO. T. PINCKNEY,
 WILLIAM G. MOTT.